March 31, 1925. 1,531,356

C. L. STUBBS

MOLDING MACHINE

Filed Oct. 14, 1922  2 Sheets-Sheet 1

Charles L. Stubbs, Inventor

By F. E. Sh——

Attorney

March 31, 1925.  1,531,356

C. L. STUBBS

MOLDING MACHINE

Filed Oct. 14, 1922   2 Sheets-Sheet 2

Inventor
Charles L. Stubbs
By F. C. Sh——
Attorney

Patented Mar. 31, 1925.

1,531,356

UNITED STATES PATENT OFFICE.

CHARLES L. STUBBS, OF AKRON, OHIO.

MOLDING MACHINE.

Application filed October 14, 1922. Serial No. 594,620.

*To all whom it may concern:*

Be it known that I, CHARLES L. STUBBS, a citizen of the United States, residing at Akron, in the county of Summit and State of Ohio, have invented new and useful Improvements in Molding Machines, of which the following is a specification.

This invention relates to certain new and useful improvements in molding machines and has particular reference to a machine for casting pigs, the device of this invention being particularly adapted for use in casting pigs of linotype metal.

Objects of the invention are to provide a new and novel molding device of simple, relatively inexpensive construction which in use will provide convenient means whereby a plurality of molds may be simultaneously filled with molten metal.

A further object is to provide a machine of the class above indicated having associated therewith new and improved means for automatically removing the pigs from the molds.

The above and additional objects are accomplished and additional ends are attained by the novel construction, combination and arrangement of parts hereinafter described and illustrated in the accompanying drawing, wherein I have shown a preferred embodiment of the invention, it being understood that the invention is capable of various adaptations and that changes and modifications may be made or substitutions resorted to which come within the scope of the claims hereunto appended.

In the drawings in which similar numerals of reference are employed to designate like parts as the same may appear in any of the several views and in which:—

Figure 1:
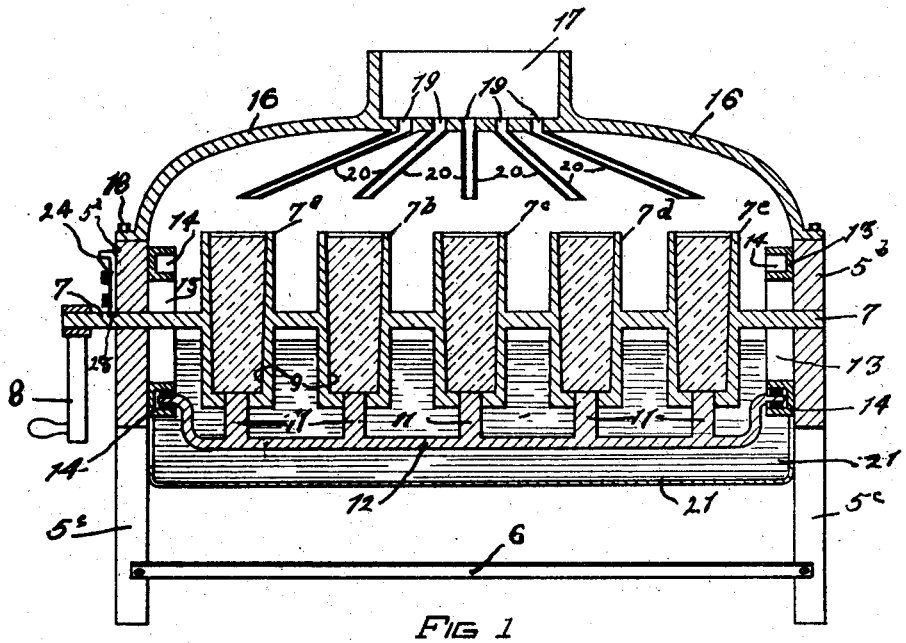
Figure 1 is a central, vertical sectional view taken as indicated by the line 1—1 of Figure 3 and showing the molds as the same are positioned while being filled with molten metal.

Proceeding now to a detailed description of the invention with reference to the particular adaptation thereof, shown in the accompanying drawings, the numeral 5 is used generally to denote a frame or supporting structure which may be of any desired construction.

In the particular form of construction shown in the drawings, the reference characters $5^a$ and $5^b$ are used to denote suitable side plates which are provided with the usual supporting legs $5^c$. The numeral 6 is used to denote cross bars which are secured to the legs $5^c$ to hold the side plates $5^a$ and $5^b$ in spaced relation. The numeral 7 is used to denote a shaft member which is mounted in suitable bearings in the side plates $5^a$ and $5^b$ and is provided with a plurality of molds $7^a$, $7^b$, $7^c$, $7^d$ and $7^e$ which are integrally formed with the shaft member 7 and are arranged therein in parallel spaced relation. The said molds are formed on the shaft member 7 with the axis of rotation passing centrally through the molds at a right angle to the axis of each mold. The shaft 7 projects outwardly from the side plates $5^a$ and is provided on the outwardly projecting end thereof with a crank 9 which is fixed thereto to provide convenient means whereby the said shaft member 7 may be given a rotary movement. The molds $7^a$, $7^b$, $7^c$, $7^d$, and $7^e$ are identical in form, each being provided with a tapered cavity 9 which extends into the mold from the upper side thereof, each cavity being relatively smaller at the bottom of the mold. Each of said molds is provided at the bottom thereof with a bore 10 which extends coaxially therethrough.

The numeral 12 denotes a cross member which is provided with a plurality of plugs 11 which project therefrom in parallel relation to each other and are arranged with one of the plugs 11 fitted in each bore 10. The stationary cam member 13 is secured to the inner face of each side plate $5^a$ and $5^b$ so as to be operatively positioned around the shaft 7. Each cam member 13 is provided with a groove 14 which follows a circular path running concentrically with the shaft 7 except at the upper portion of the member 13 where the groove curves inwardly and is nearer the shaft 7. Each end of the cross member 12 is entered in the groove 14 in the cam member on its respective side of the frame 5 and the said cross member is preferably provided, at each end thereof, with a roller 14 or other means to reduce friction between the said ends and the walls of the groove 14.

In the particular adaptation of the invention illustrated in the drawings, the member 12 is curved inwardly then outwardly adjacent each end thereof, this feature permitting a substantial reduction in the diameter of the cam 13.

The numeral 16 denotes a member which extends across the upper portion of the machine in spaced relation to the molds in the shaft 7. The member 16 is secured at each end thereof to the frame 5 by means of the bolts 18 or other suitable fastening means. The member 16 is provided with a basin 17 which is preferably formed integrally therewith. The basin 17 is provided in the bottom thereof with a plurality of outlets 19 and an outlet pipe 20 extends from said outlets to a point directly above each of said molds.

The numeral 21 denotes a shelf which extends across the frame below the shaft member 7. The shelf 21 is secured to the side plates $5^a$ and $5^b$ and is inclined downwardly toward the forward side of the machine for a purpose to be hereinafter set forth.

The numeral 24 denotes a slide bolt which is positioned on the side plates $5^a$ at a point directly above the shaft 7 and is adapted to seat in the recess 23 to secure the shaft 7 against rotary movement when the molds are in an upright position.

Figure 2:
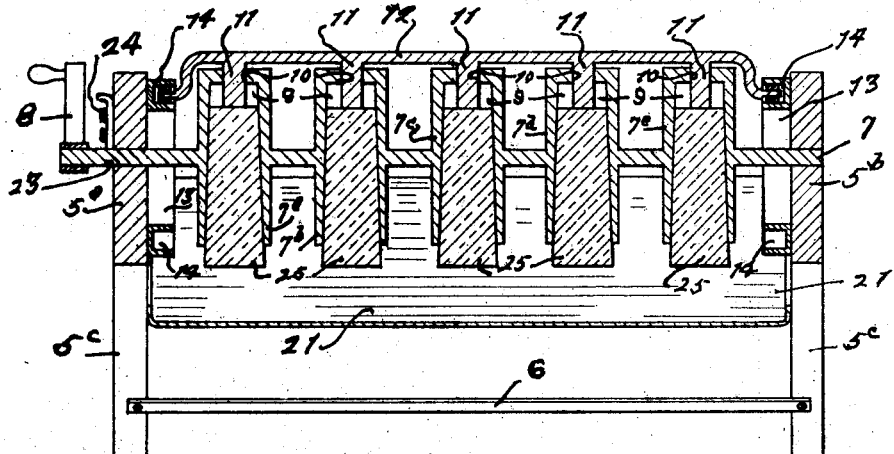
Figure 2 is a similar sectional view with the upper portion of the machine omitted and showing the manner of automatically removing the pigs from the molds.
Figure 3:
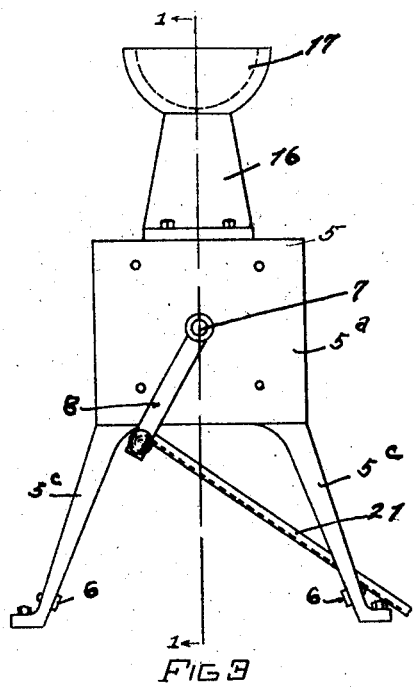
Figure 3 is a side elevational view of a molding machine constructed in accordance with this invention.
Figure 4:
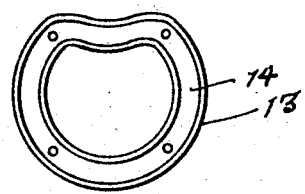
Figure 4 is a plan view of one of the cams employed in carrying out the invention.

In use, the shaft member 7 is operated to the position shown in Figure 1 and molten metal is poured, pumped or otherwise introduced into the basin 17. The metal flows through the tube 20 to the molds $7^a$, $7^b$, $7^c$, $7^d$ and $7^e$. The metal is then permitted to solidify, whereupon the bolt 22 is released and the crank 18 operated to invert the molds as shown in Figure 2. The cross member 12 having each end thereof positioned in one of the cam grooves 14 is forced inwardly as it reaches the upper part of the cam and the plugs 11 are moved inwardly forcing the pigs 25 from the molds. Upon being released from the molds, the pigs 25 will drop upon the inclined shelf 21 and will be deposited directly in front of the machine.

Having thus illustrated my invention and described the same in detail what I claim as new and desire to secure by Letters Patent is:—

1. In a device of the class described, a frame, a member rotatably mounted therein for rotation on a horizontal axis, said member provided with a plurality of molds arranged thereon in spaced parallel relation, with the axes of the molds disposed at substantially a right angle to and intersecting the axis of rotation; an opening in the bottom of each mold, a thrust member slidably mounted in each opening so as to completely close the same, all of said thrust members secured to a bar extending transversely of the frame, and a stationary cam arranged around said rotatable member at each end of the frame, said cam provided with a groove adapted to receive the ends of said bar which are mounted therein, said grooves formed to cause an inward movement of said thrust members, when the member is rotated to bring the molds in an inverted position.

2. In a device of the class described, a frame, a member rotatably mounted therein for rotation on a horizontal axis, said member provided with a plurality of molds arranged thereon in spaced parallel relation, with the axes of the molds disposed at substantially a right angle to and intersecting the axis of rotation; an opening in the bottom of each mold, a thrust member slidably mounted in each opening so as to completely close the same, all of said thrust members secured to a bar extending transversely of the frame; a basin adapted to receive molten metal positioned on said frame at a point above said molds and a tube leading from said basin to a point directly above the mouth of each mold.

3. In a device of the class described, a frame, a member rotatably mounted therein for rotation on a horizontal axis, said member provided with a plurality of molds arranged thereon in spaced parallel relation, with the axes thereof disposed at substantially a right angle to and intersecting the axis of rotation; a basin adapted to receive molten metal positioned on said frame at a point above said molds and a tube leading from said basin to a point directly above the mouth of each mold.

4. In a device of the class described, a frame, a member rotatably mounted therein for rotation on a horizontal axis, said member provided with a plurality of tapered mold cavities arranged thereon in spaced relation, with the axes thereof at substantially a right angle to and intersecting the axis of rotation, an opening in the bottom of each mold, a thrust member slidably mounted in each opening and means to simultaneously operate said thrust members to loosen the contents of the molds.

5. In a device of the class described a frame, a plurality of parallelly arranged, rigidly connected molds mounted thereon for rotary movement on a horizontal axis, a stationary basin adapted to receive molten metal positioned on said frame at a point above said molds and a tube leading from said basin to a point directly above the mouth of each mold.

6. In a device of the class described, in combination a rotatably mounted mold member having a plurality of parallelly arranged mold cavities and a stationary basin provided with a plurality of outlet tubes, one of said tubes leading to each of said cavities.

7. In a device of the class described in combination, a mold member mounted for rotation on a horizontal axis, said mold member provided with a plurality of parallelly arranged mold cavities, and means to simultaneously fill all of said molds.

8. In a device of the class described a rotatably mounted mold member provided with a plurality of parallelly arranged mold cavities and means to simultaneously remove the contents of said molds.

9. In a device of the class described, in combination a mold member mounted for rotation on a horizontal axis, said mold member provided with a plurality of parallelly arranged mold cavities, means to simultaneously fill all of said cavities with molten metal and means to simultaneously eject the soldified metal from said cavities.

10. In a device of the class described a member mounted for rotation on a horizontal axis, said member provided with a plurality of parallelly arranged molds, means to lock said member against rotation with the molds in an upright position; means to simultaneously fill all of said molds with molten metal and means to eject the solidified metal from said molds, said means being automatically operable when the member is rotated to bring the molds in an inverted position.

In testimony whereof I have hereunto set my hand.

CHARLES L. STUBBS,